United States Patent [19]
Kimble

[11] Patent Number: 5,251,102
[45] Date of Patent: Oct. 5, 1993

[54] COMPUTER AND COMPUTER TERMINALS WITH DEPENDING, SUPPORTING RIDGE

[75] Inventor: Thomas E. Kimble, Glendale, Ohio

[73] Assignee: Randon Corporation, Cincinnati, Ohio

[21] Appl. No.: 774,473

[22] Filed: Oct. 10, 1991

[51] Int. Cl.⁵ .......................... H05K 5/03; G06F 1/16
[52] U.S. Cl. ..................................... 361/683; 400/83; 361/724; 361/680
[58] Field of Search ............ 364/708; 312/208, 208.1, 312/208.3, 223.2; 206/305; 400/83, 713, 714, 680, 681, 682, 685; 248/447, 461, 677, 917, 918, 919, 920, 921, 922, 923; 235/1 D, 145 R; 361/340, 380, 390, 392

[56] References Cited
U.S. PATENT DOCUMENTS

| | | | |
|---|---|---|---|
| 2,596,652 | 5/1952 | Chvilicek | 312/208 |
| 2,924,495 | 2/1960 | Haines | 206/305 X |
| 3,314,739 | 4/1967 | Mendelson | 312/208 X |
| 3,961,159 | 6/1976 | Hursey | 235/1 D |
| 4,259,568 | 3/1981 | Dynesen | 206/305 X |
| 4,589,659 | 5/1986 | Yokoi et al. | 364/708 X |
| 4,882,471 | 11/1989 | Kai | 235/1 D |
| 4,980,676 | 12/1990 | Nomura et al. | 364/708 X |

*Primary Examiner*—Leo P. Picard
*Assistant Examiner*—Michael W. Phillips
*Attorney, Agent, or Firm*—Eugene F. Friedman

[57] ABSTRACT

A housing for a laptop computer or computer terminal and the computer and terminal themselves in which opening the top causes a curved surface to descend below the computer's rear, bottom surface. This ridge runs across at least half of the bottom of the computer's back and preferably the entire computer. It serves to support the bottom section of the cover, and thus the keyboard, when used on a person's lap at a suitable angle. Specifically, it elevates the rear of the keyboard so that the hands have facile access to all the keys. The curved surface is formed integrally with the edge of the computer cover's upper section. When the top closes, the surface moves to a position where it does not descend below the bottom of the cover in order to provide a neat, portable package. Opening the top causes the surface, or ridge, to occupy the position where it will sit on the person's legs to prop up the keyboard.

44 Claims, 1 Drawing Sheet

COMPUTER AND COMPUTER TERMINALS WITH DEPENDING, SUPPORTING RIDGE

BACKGROUND

Portable computers and computer terminals have achieved a recent popularity amongst users. They have the natural advantage that they submit to use wherever desired. Most portable computers find use on a person's lap. These so-called "laptop" computers or terminals do not even require a supporting surface before an individual may make use of them; he simply opens the top and places the device on his legs extended in front of him while sitting. Thus, he may use the laptop computer or terminal while sitting on a chair, on a bench, or even while riding on a plane or a train.

The difficulty with the use of laptop instruments concerns the fact that the legs of an individual, when sitting, typically slop downward toward the knees. This places the keyboard at almost exactly the wrong angle for convenient use by the individual. Typically, for good typing practice, the back of the keyboard should slope upwards relative to the front. The position of having the back portion of the keyboard slope downward makes the usual data entry or typing task much more difficult.

Many keyboards used with modern computers have feet at their read edges. These feet have the purpose of propping up the rear portion of the keyboard to achieve the correct position for the most efficient typing. Typically, these feet may fold into the bottom of the keyboard when the elevation proves unneeded or simply for the transportation of the keyboard itself.

The feet work well to prop up the rear of the keyboard when placed on a flat surface. However, when placed on a person's lap, the feet may very well not actually sit on top of his legs. In fact, their location at the outer regions of the keyboard may cause them to miss a person's legs entirely. Additionally, even if they sat on the person's legs, they may, in fact, not provide sufficient height to place the keyboard at the correct typing position. Moreover, having feet which recede into the keyboard could prove a serious problem for portable, laptop computer terminals or covers. The portable terminal or computer has become so small that is has, in many instances, no volume to spare to retract the feet into its bottom. For this reason too, the usual keyboard feet may prove impractical. As a result, the search continues for a portable, laptop computer or terminal which can support the keyboard at the correct angle for proper data entry or typing.

SUMMARY

Typically, a laptop computer or computer terminal housing has a top and a bottom. The bottom includes the keyboard and various function keys while the top will have some sort of display or screen. The top and bottom can rotate relative to each other about an axis to actually close the two portions together and achieve portability. Naturally, the user must open the top and place it in a configuration in which he can view the screen that it contains. In the open configuration, the top portion, properly configured, can extend a ridge below the bottom of the keyboard section of the computer or terminal. This ridge will then support the rear of the keyboard at a desired height above the user's legs. By curving this edge or ridge which rests on the user's legs, the keyboard can retain the appropriate angle for use even though the top occupies any of a number of configurations relative to the bottom. Thus, changing the angle which the user views the keyboard will not substantially alter the angle at which he will type on the keyboard.

More specifically, a cover for a laptop computer or computer terminal has first a lower section with a first front edge, a first rear edge, and first and second side edges. The side edges connect to the first front edge and the first rear edge and typically form a rectangle. The lower section also includes, of course, a bottom surface connected to the front, rear, and side edges.

Second, the cover has an upper section which also has a second front edge, a second rear edge, and third and fourth side edges connected to the front and rear edges. The top surface then connects to the four edges.

Further, such a cover will include a holding device which couples to the upper and lower sections. It retains the upper section at any of a plurality of configurations relative to the lower section.

In a particular one of these configurations, the holding device retains the upper section directly on top of the lower section. Thus, it places the front edge of the upper section adjacent to that of the lower section, the back edge of the upper section adjacent to the lower back edge, and the side edges adjacent to each other. Obviously, in other configurations, it holds most of the upper section away from the section. The change in configuration results from rotating the upper section about an axis which passes through both the upper and lower sections. Where the cover includes the computer or terminal on its interior, rotating the upper section in this fashion gives the user access to the keyboard and allows him to view the screen.

An improved laptop computer terminal or even a cover for such an instrument results from the inclusion of a supporting device, coupled to the upper section. When the upper section occupies any configuration other than its closed position, the supporting device holds the rear edge of the lower section off a surface on which the cover or instrument is placed. The supporting device itself includes a tilting surface which extends at least about half of the distance between the side edges of the lower section. This tilting surface, when the upper section occupies an open configuration, extends below the bottom surface of the lower section. Preferably, of course, this tilting surface will extend virtually all the distance between the two side edges so that the user need not worry where he has placed the computer cover on his lap. This tilting surface will contact his legs and support the keyboard in the appropriate position for typing. when this surface has a curvature to it, changing the exact position of the top relative to the bottom will not have a substantial effect upon the angle at which this tilting surface supports the keyboard.

DETAILED DESCRIPTION

As seen in the figures, the computer terminal shown generally at 11 includes the lower section 12 and the upper section 13. Sitting inside the lower section appears the keyboard indicated generally at 14 with the various keys 15. The upper section 13 includes the screen 16.

Figure 3:
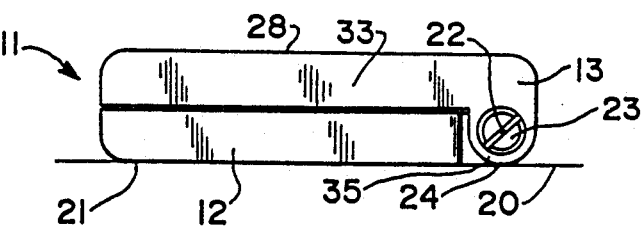
FIG. 3 gives a side elevational view of the laptop computer terminal cover of FIGS. 1 and 2 in the closed configuration.

FIG. 3 shows the terminal cover 11 in its closed configuration. As seen there, the top 13 sits closely onto the bottom 12. In this configuration, it submits to facile portability, the keyboard 14 and screen 16, if present, receive the protection of the two portions of the cover. Furthermore, the bottom 12 sits flatly upon surface 20. Stated in other words, when closed, no portion of the top cover 13 extends below the bottom 21 of the lower section 12.

To open the computer or terminal 11 from the configuration shown in FIG. 3 involves rotating the upper section 13, relative to the lower section 12, about the axis 22 located at the middle of the adjusting screw 23. As seen from the figures, the axis 23 in fact passes through the end brackets 24 of the top 13 as well as through the bottom 12.

To utilize the computer or computer terminal inside the cover 11, the operator opens the top 13 until it achieves an angle at which he can conveniently view the display screen 16. The cover 11, to keep the screen in a selected position, may include a clutch mechanism coupled between the top 13 and the bottom 12. The clutch resists forces which tend to displace the screen 16, and thus the top 13, from the position, relative to the bottom 12, selected by the user. A particularly propitious device appears in U.S. Pat. No. 4,781,422, ADJUSTABLE CLUTCH MECHANISM, issued on Nov. 1, 1988, to Thomas E. Kimble. The screw 23 permits the adjustment of the clutch mechanism so that the user may decide upon the amount of force required to close or open the top 13. As seen from the figures, whether employing this particular clutch mechanism or some other, the top 13 may occupy an infinite number of configurations relative to the bottom 12. Simply rotating the top 13 about the axis 22 will accomplish this result. Stated in other terms, the top submits to infinite adjustment relative to the bottom 12.

Figure 1:
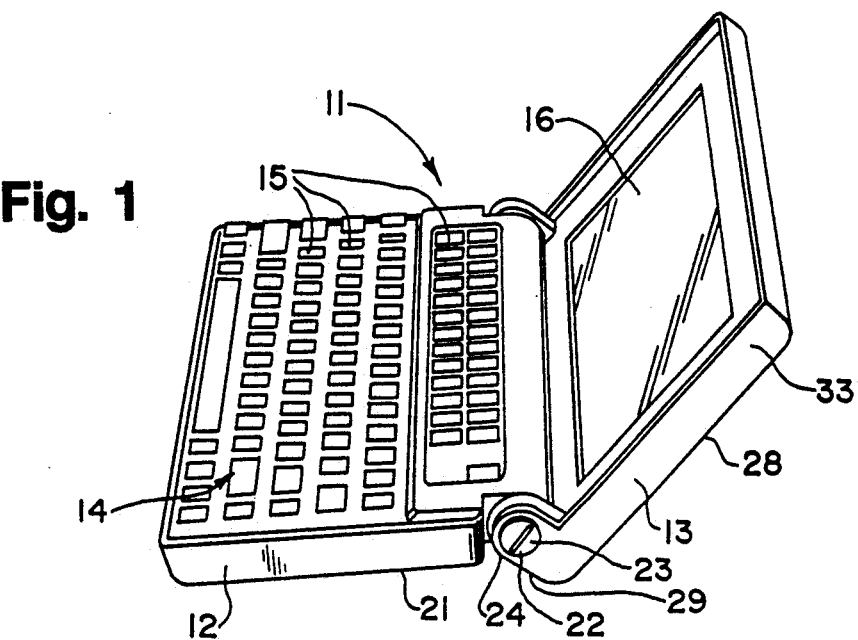
FIG. 1 provides a perspective view of a laptop computer terminal cover which, in its interior, includes both the usual keyboard in the lower section and the screen in the upper section. The cover appears in an open configuration.
Figure 2:
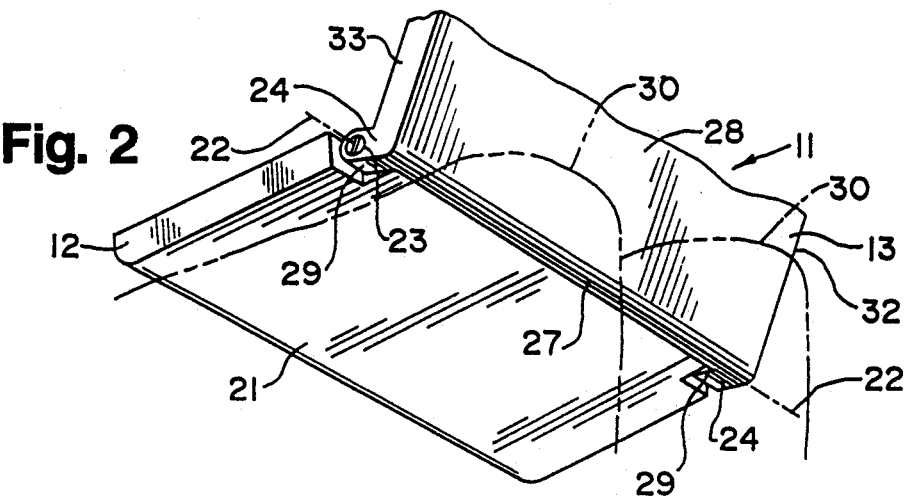
FIG. 2 gives an isometric view of the bottom and rear of the computer terminal cover of FIG. 1 in an open configuration with the cover resting on an individual's legs, shown in phantom.
Figure 4:
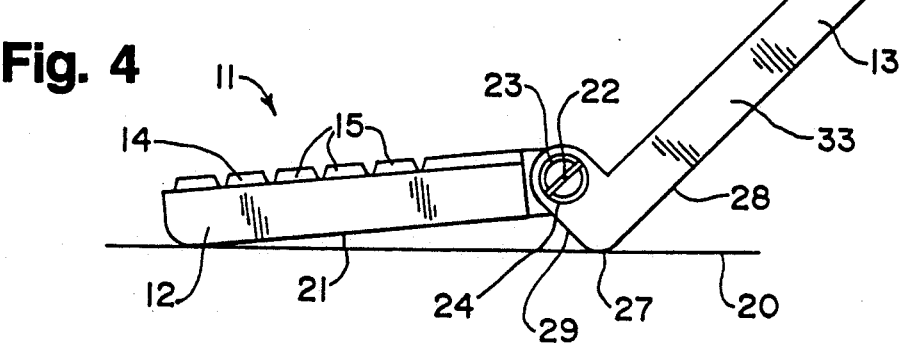
FIG. 4 provides a side elevational view of the laptop computer terminal of the prior figures but shown in an open configuration and resting upon a surface.

In an open configuration as seen in FIGS. 1, 2, and 4, the top 13 has the rounded ridge 27 between its upper surface 28 and its rear surface 29. This rounded ridge 27, when the upper section 13 occupies an open configuration, extends below the bottom surface 21 of the lower section 12. Thus extended downward, it supports the rear of the upper section 12 off of a surface upon which placed. In FIG. 2, accordingly, it supports the rear of the lower section 12 with a keyboard off of the user's legs shown in phantom at 30. In FIG. 4, it places the rear of the lower section 12 above the flat surface 20.

The rounded ridge 27, as seen in particular in FIG. 2, extends substantially the entire length of the upper section 13 between its sides 32 and 33. However, it may not need to have this length for its purpose of maintaining the bottom 21 of the lower section 12 off the surface on place including a user's lap. However, to accomplish the latter objective, it should extend about half the length between the sides 32 and 33.

The rounding of the ridge 27 accomplishes a further purpose. As seen in particular in FIG. 4, this curved surface displays cylindrical symmetry relative to the axis 22. Thus, as the top 13 rotates about the axis 22, the portion of the ridge 27 in contact with the surface 20 maintains a substantially constant separation from the axis 22. This means that the rear of the lower section 12 with the keyboard 14 remains at an approximately constant elevation from the surface 20. Thus, as the user adjusts the top section 13 to most propitiously view the screen 16, it does not alter the angle of the keyboard 14 contained in the bottom section 12. It accordingly remains at an angle most convenient for his use. Yet, if the upper section 13 were to make a perpendicular angle relative to the lower section 12, the flat rear edge 29 would not extend below the bottom surface 21 of the lower section 12. This would allow the lower section 12 to lie flat upon the surface 20. Furthermore, when closed as seen in FIG. 3, the curved surface 35 does not extend below the lower surface 21 of the bottom section 12. This allows the cover 12 to make a compact unit for facile transportation.

Accordingly, what is claimed is:

1. In a laptop computer or computer terminal housing having a lower section having a first front edge, a first rear edge, and first and second side edge connected to said first front edge and said first rear edge, and a bottom surface connected to said first front edge, said first rear edge, and said first and second side edges, an upper section having a second front edge, a second rear edge, third and fourth side edges connected to said second front edge and said second rear edge, and a top surface connected to said second front edge, said second rear edge, and said third and fourth side edges, and holding means, coupled to said upper section and to said lower section, for retaining said upper section in any of a plurality of configurations relative to said lower section, with said holding means, in a closed configuration, retaining said upper section upon said lower section, with said first front edge adjacent to said second front edge, said first rear edge adjacent to said second rear edge, and said first and second side edges adjacent to said third and fourth side edges, respectively, and in at least two open configurations, retaining most of said upper section away from said lower section, said configurations differing from each other by rotating said upper section, relative to said lower section, about an axis passing through both said upper section and said lower section, one of said open configurations lying intermediate said closed configuration and another open configuration, the improvement comprising support means, coupled to said upper section, for, when said upper section is in one of said open configurations, holding said first rear edge of said lower section off a surface on which said computer housing is placed, said support means including a tilting surface extending at least about half of the distance between said third and fourth side edges of said upper section, said tilting surface, when said upper section occupies one of said open configurations, extending below said bottom surface of said lower section with said first front edge on said surface on which said computer housing is placed.

2. The improvement of claim 1 wherein said lower section, on the side opposite said bottom surface includes a keyboard and wherein said upper section, when in said closed configuration, covers a keyboard.

3. The improvement of claim 2 wherein said holding means retains said upper section in any of an infinite number of configurations between any two of said open configurations.

4. The improvement of claim 3 wherein said tilting surface displays a curvature on planes perpendicular to said axis of rotation.

5. The improvement of claim 4 further including locking means, coupled to said upper section, said lower section, and said holding means, for resisting a force applied to said upper and lower sections tending to move said upper section relative to said lower section away from a configuration in which said upper section has been placed.

6. The improvement of claim 5 wherein said upper section, when in said closed configuration, does not extend below said lower surface of said lower section.

7. The improvement of claim 6 wherein said upper section includes a straight surface connecting to said curved surface wherein said straight surface lies perpendicular to and removed from said upper surface of said upper section.

8. The improvement of claim 7 wherein said curved surface forms part of said second rear edge.

9. The improvement of claim 8 wherein said upper section includes a display screen with said screen not being visible to view when said upper section occupies said closed configuration.

10. The improvement of claim 9 wherein said support means extends substantially the entire length between said third and fourth side edges.

11. The improvement of claim 8 wherein said curved surface maintains said first rear edge of said upper section at a substantially constant distance from the surface on which said lower section is placed as said upper section is rotated over an arc segment relative to said lower section about said axis of rotation 12. The improvement of claim 11 wherein said support means extends substantially the entire length said third and fourth side edges.

13. The improvement of claim 8 wherein said curved section is integral with said second rear edge.

14. The improvement of claim 13 wherein said curved surface maintains said first rear edge of said upper section at a substantially constant distance from the surface on which said lower section is placed as said upper section is rotated over an arc segment relative to said lower section about said axis of rotation.

15. The improvement of claim 14 wherein said second rear edge is substantially perpendicular to said upper surface of said upper section.

16. The improvement of claim 15 wherein said upper section includes a display screen with said screen not being visible to view said upper section occupies said particular configuration.

17. The improvement of claim 16 wherein said support means extends substantially the entire length between said third and fourth side edges.

18. The improvement of claim 17 further including adjusting means, coupled to said locking means, for varying the force required to move said upper section, relative said lower section, out of a configuration into which said upper section has been placed.

19. The improvement of claim 8 wherein said second rear edge is substantially perpendicular to said upper surface of said upper section.

20. The improvement of claim 19 wherein said support means extends substantially the entire length between said third and fourth side edges.

21. The improvement of claim 20 wherein said upper section includes a display screen with said screen not being visible to view when said upper section occupies said particular configuration.

22. The improvement of claim 8 further including adjusting means, coupled to said locking means, for varying the force required to move said upper section, relative said lower section, out of a configuration into which said upper section has been placed.

23. The improvement of claim 22 wherein said support means extends substantially the entire length between said third and fourth side edges.

24. The improvement of claim 23 wherein said upper section includes a display screen with said screen not being visible to view when said upper section occupies said closed configuration.

25. In a laptop computer or terminal having a housing with a lower section having a first front edge, a first rear edge, and first and second side edges, a bottom surface connected to said first front edge and said first rear edge, a bottom surface connected to said first front edge, said first rear edge, and said first and second side edges, and a keyboard on the surface of said lower section opposite said lower surface, an upper section having a second front edge, a second rear edge, third and fourth side edges connected to said second front edge and said second rear edge, a top surface connected to said second front edge, said second rear edge, and said third and fourth side edges, and a display screen on the surface of said upper section opposite said upper surface, and holding means, coupled to said upper section and to said lower section, for retaining said upper section in any of a plurality of configurations relative to said lower section, with said holding mans, in a closed configuration, retaining said upper section upon said lower section with said display screen adjacent to said keyboard, said first front edge adjacent to said second front edge, said first rear edge adjacent to said second rear edge, and said first and second side edges adjacent to said third and fourth side edges, respectively, and an open configuration, retaining most of said upper section away from said lower section, said configurations differing from each other by rotating said upper section, relative to said lower section, about an axis passing through both said upper section and said lower section, the improvement comprising support means, coupled to said upper section, for, when said upper section is in said open configuration, holding said first rear edge of said lower section off a surface on which said computer cover is placed, said support means including a tilting surface extending at least about half of the distance between said third and fourth side edges of said lower section, said tilting surface, when said upper section occupies said open configuration, extending below said bottom surface of said lower section.

26. The improvement of claim 25 wherein said holding means retains said upper section in any of an infinite number of configurations between any two open configurations.

27. The improvement of claim 26 wherein said tilting surface faces displays a curvature on planes parallel to said axis of rotation.

28. The improvement of claim 27 further including locking means, coupled to said upper section, said lower section, and said holding means, for resisting a force applied to said upper and lower sections tending to move said upper section relative to said lower section away from a configuration in which said upper section has been placed.

29. The improvement of claim 28 wherein said upper section, when in said closed configuration, does not extend below said lower surface of said lower section.

30. The improvement of claim 29 wherein said upper section includes a straight surface connecting to said curved surface wherein said straight surface lies parallel to and removed from said upper surface of said upper section.

31. The improvement of claim 30 wherein said curved surface forms part of said second rear edge.

32. The improvement of claim 31 wherein said upper section includes a display screen with said screen not being visible to view when said upper section occupies said closed configuration.

33. The improvement of claim 32 wherein said support means extends substantially the entire length between said third and fourth side edges.

34. The improvement of claim 30 wherein said curved surface maintains said first rear edge of said upper section at a substantially constant distance from the surface on which said lower section is placed as said upper section is rotated over an arc segment relative to said lower section about said axis of rotation.

35. The improvement of claim 34 wherein said support means extends substantially the entire length between said third and fourth side edges.

36. The improvement of claim 30 wherein said curved section is integral with said second rear edge.

37. The improvement of claim 36 wherein said curved surface maintains said first rear edge of said upper section at a substantially constant distance from the surface on which said lower section is placed as said upper section is rotated over an arc segment relative to said lower section about said axis of rotation.

38. The improvement of claim 37 wherein said second rear edge is substantially perpendicular to said upper surface of said upper section.

39. The improvement of claim 38 wherein said upper section includes a display screen with said screen not being visible to view when said upper section occupies said closed configuration.

40. The improvement of claim 39 wherein said support means extends substantially the entire length between said third and fourth side edges.

41. The improvement of claim 40 further including adjusting means, coupled to said locking means, for varying the force required to move said upper section, relative said lower section, out of a configuration into which said upper section has been placed.

42. The improvement of claim 30 wherein said second rear edge is substantially perpendicular to said upper surface of said upper section.

43. The improvement of claim 42 wherein said support means extends substantially the entire length between said third and fourth side edges.

44. The improvement of claim 43 wherein said upper section includes a display screen with said screen not being visible to view when said upper section occupies said closed configuration.

* * * * *